United States Patent
Sauer et al.

(10) Patent No.: US 12,215,246 B2
(45) Date of Patent: Feb. 4, 2025

(54) COMPOSITION COMPRISING A LIGHT-WEIGHT FILLER

(71) Applicant: Henkel AG & Co. KGaA, Duesseldorf (DE)

(72) Inventors: Ralf Sauer, St. Leon-Rot (DE); Michael Klotz, Duesseldorf (DE); Thomas Zahn, Bammental (DE); Peter Born, Sandhausen (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 167 days.

(21) Appl. No.: 16/693,637

(22) Filed: Nov. 25, 2019

(65) Prior Publication Data

US 2020/0087532 A1   Mar. 19, 2020

Related U.S. Application Data

(63) Continuation of application No. PCT/EP2018/067224, filed on Jun. 27, 2018.

(30) Foreign Application Priority Data

Jun. 28, 2017 (EP) ..................... 17178456

(51) Int. Cl.
*C09D 147/00* (2006.01)
*C09D 5/02* (2006.01)
*C09D 7/40* (2018.01)
*C09D 7/61* (2018.01)

(52) U.S. Cl.
CPC ............ *C09D 147/00* (2013.01); *C09D 5/02* (2013.01); *C09D 7/61* (2018.01); *C09D 7/69* (2018.01); *C09D 7/70* (2018.01); *C08L 2203/14* (2013.01); *C08L 2205/025* (2013.01)

(58) Field of Classification Search
CPC ........... C08L 2205/025; C08L 2205/03; C08L 2203/14; C04B 14/185; C04B 20/06; C08J 9/0006; C08J 9/0061; C08J 9/32; C08J 2203/22; C08J 2201/026; C08K 7/24; C08K 7/28; C08K 3/06; C08K 3/34; C08K 3/36; C09J 2207/00; C09D 7/69; C09D 7/70; C09D 5/02
USPC .................. 521/142–189; 428/36.5
See application file for complete search history.

(56) References Cited

U.S. PATENT DOCUMENTS

| | | | | | |
|---|---|---|---|---|---|
| 3,961,978 A | * | 6/1976 | Brodmann | ............... | C04B 20/06 501/39 |
| 4,183,980 A | * | 1/1980 | Nielsen | ............... | C04B 20/1051 427/221 |
| 4,657,938 A | * | 4/1987 | Fithian | ..................... | B05D 7/24 521/149 |
| 5,002,696 A | * | 3/1991 | White | ................... | F27D 3/0033 252/378 R |
| 5,075,343 A | * | 12/1991 | Blount | ............... | C08G 18/3897 521/85 |
| 5,118,531 A | * | 6/1992 | Petersen | ................. | C09J 123/16 427/247 |
| 2007/0173553 A1 | | 7/2007 | Taylor, Jr. | | |
| 2016/0289431 A1 | * | 10/2016 | Sauer | ....................... | C08L 9/00 |
| 2017/0313910 A1 | * | 11/2017 | Bieber | ...................... | B32B 7/12 |

FOREIGN PATENT DOCUMENTS

| | | | | | |
|---|---|---|---|---|---|
| CA | 990034 A | * | 6/1976 | ............... | C08J 9/32 |
| CN | 101772532 | | 7/2010 | | |
| CN | 102514322 A | | 6/2012 | | |
| CN | 102604321 A | | 7/2012 | | |
| CN | 102633974 A | | 8/2012 | | |
| CN | 104513453 A | | 4/2015 | | |
| CN | 104804368 A | | 7/2015 | | |
| CN | 104895203 A | | 9/2015 | | |
| CN | 105968297 A | | 9/2016 | | |
| CN | 105968298 A | | 9/2016 | | |
| CN | 106046295 A | | 10/2016 | | |
| CN | 106118032 A | | 11/2016 | | |
| CN | 106146780 A | | 11/2016 | | |
| CN | 106243695 A | | 12/2016 | | |
| CN | 106893070 A | | 6/2017 | | |
| DE | 2254305 A1 | | 5/1973 | | |
| DE | 2242548 A1 | | 3/1974 | | |
| GB | 1342090 A | * | 12/1973 | ............ | C08J 9/0095 |
| JP | S4825718 A | | 4/1973 | | |
| JP | S4858062 A | | 8/1973 | | |
| JP | S4953976 A | | 5/1974 | | |
| JP | 2014520951 A | | 8/2014 | | |

(Continued)

OTHER PUBLICATIONS

Clutton et al., Structure-Property Relationships in Thermoplastic Foams, Cellular Polymers, Rapra Technology Ltd, 1991 (Year: 1991).*
International Search Report for PCT/EP2018/067224, mailed Aug. 22, 2018.

(Continued)

*Primary Examiner* — Yan Lan
(74) *Attorney, Agent, or Firm* — Mary K. Cameron

(57) ABSTRACT

The present invention relates to compositions containing at least one reactive binder, at least one curing agent and/or accelerator, at least one thermally activatable blowing agent and at least one light-weight filler, wherein at least one expanded particle of at least one glass-rich volcanic rock with a closed outer shell is contained as a light-weight filler. The invention also relates to a method for stiffening and/or reinforcing components with thin-walled structures with a corresponding composition as well as to correspondingly produced components.

20 Claims, No Drawings

(56) References Cited

FOREIGN PATENT DOCUMENTS

| KR | 20120053287 A1 * | 5/2012 | ............. C08G 18/14 |
|---|---|---|---|
| WO | 2007004184 A1 | 1/2007 | |
| WO | 2012027510 A1 | 3/2012 | |
| WO | 2013053635 A1 | 4/2013 | |
| WO | WO-2015091611 A1 * | 6/2015 | ........... C08K 5/0016 |

OTHER PUBLICATIONS

Search Report for EP 3421527 dated Aug. 17, 2017. All references cited in the EP Report were previously made of record.

* cited by examiner

COMPOSITION COMPRISING A LIGHT-WEIGHT FILLER

The present invention relates to compositions containing at least one reactive binder, at least one curing agent and/or accelerator, at least one thermally activatable blowing agent and at least one lightweight filler, wherein at least one expanded particle of at least one glass-rich volcanic rock having a closed outer shell is contained as the lightweight filler, to a method for stiffening and/or reinforcing components which have thin-walled structures comprising a corresponding composition, and to components produced accordingly.

In industry today, especially in the automotive industry, there is steadily increasing interest in structures which are particularly light, and yet still stable. This is achieved in particular by lightweight components. For example, in a number of fields of application, there is need for lightweight components that are intended for dimensionally consistent batch production and have high rigidity and structural strength. In vehicle construction in particular, given the desire to reduce weight, there is great need for lightweight components consisting of thin-walled structures which nevertheless have adequate rigidity and structural strength. One way to achieve high rigidity and structural strength while keeping the weight of the component as low as possible is to use hollow parts made from relatively thin sheet metal or plastics sheets. However, thin-walled sheet metal tends to deform easily. Therefore, in the case of hollow body structures, it has been known for some time to fill the cavity with a structural foam, completely or only partially, for example in portions subject to particularly high levels of mechanical stress. This can result in deformations or distortions being minimized, or even completely prevented, and in the strength and rigidity of the hollow body structures being increased.

Such foamed reinforcing and stiffening agents are usually either metal foams or are made from thermally curable and expandable preparations, for example based on epoxy resins. However, corresponding foamed reinforcing agents often still have inadequate rigidity, since the hardness of the resulting structure is reduced as a result of foaming.

In order for a higher strength to be achieved, but for the end product to still have a low weight, corresponding compositions have been mixed with lightweight aggregates, such as hollow glass spheres and polymer balloons. However, these lightweight fillers often have disadvantages.

Many of the lightweight fillers are relatively expensive, such as hollow glass spheres, and this unnecessarily increases the cost of the expandable compositions. Furthermore, not all lightweight fillers are fully compatible with the other constituents of the composition. For example, in liquid compositions or in compositions comprising liquid components, some lightweight fillers, such as open-pore pumice or zeolite, may partially absorb the composition or, during storage, may absorb water over time. Parts of the composition or water being absorbed in this way can result not only in the effect of the lightweight aggregate in respect of weight reduction being reduced, but also in the mechanical and optical properties of the end product being severely impaired.

Furthermore, the compositions usually have to be pumped in order to be applied. Very high pressures are nevertheless reached during this pumping process, namely pressures of up to 360 bar. This pumping process in particular poses a particular challenge for compositions comprising a lightweight filler. The high pressures in particular often result in the lightweight filler getting damaged or even being destroyed during the pumping process, as for example in the case of polymer balloons.

Accordingly, the object of the present invention was to provide compositions for the production of structural foams for the local reinforcement of components, the structures being intended to have a low weight and, at the same time, high strength. These compositions are preferably pumpable for improved workability, the compositions being intended to even withstand pump pressures of up to 360 bar without getting damaged.

Surprisingly, the object is achieved by the composition according to the claims. In a first aspect, the present invention therefore relates to a composition comprising:
 (a) at least one reactive binder;
 (b) at least one curing agent and/or accelerator;
 (c) at least one thermally activatable blowing agent; and
 (d) at least one lightweight filler, wherein at least one expanded particle of at least one glass-rich volcanic rock having a closed outer shell is contained as the lightweight filler.

In particular, the object is surprisingly solved by a method for stiffening and/or reinforcing components which have thin-walled structures, in particular tubular structures, wherein, at a temperature of below 70° C., said composition is applied to the surface of the structure to be reinforced, in particular at a pump pressure of greater than 3 bar, and said composition is cured at a later point in time at temperatures above 130° C.

The compositions according to the invention are both easy to handle and can be pumped even at pressures of up to 360 bar without the lightweight filler getting damaged. Owing to the closed outer shell thereof, the contained expanded particles of at least one glass-rich volcanic rock do not absorb any constituents of the composition or any water, and therefore the weight-reducing effect is maintained and the other mechanical properties are not adversely affected. The expanded particles are pressure stable due to the material thereof and the closed outer shell.

"At least one," as used herein, refers to 1 or more, for example 1, 2, 3, 4, 5, 6, 7, 8, 9 or more. In connection with constituents of the adhesive compositions described herein, this figure refers not to the absolute amount of molecules, but rather to the type of constituent. "At least one epoxy resin" therefore signifies, for example, one or more different epoxy resins, i.e. one or more different types of epoxy resins. Together with stated quantities, the stated amounts refer to the total amount of the correspondingly designated type of constituent, as defined above.

The weight percentages, as used herein, refer to the entire composition, unless specified otherwise.

Where reference is made in this document to molecular weights of polymer compounds, the figures refer to the number-average molecular weight $M_n$, unless specified otherwise. The molecular weight, whether a number-average or weight-average molecular weight, can be determined by means of GPC against a polystyrene standard.

The compositions according to the invention contain at least one reactive binder and at least one curing agent and/or accelerator, in particular a thermally activatable curing agent.

Preferably, the curing agent and/or accelerator is generally present in a total amount of at least 0.25 wt. %, and in particular at least 1.5 wt. %, based on the total composition. However, a total of more than 15 wt. %, based on the total weight of the composition, is generally not required. However, the proportion of the curing agent and/or accelerator can vary widely, depending on the system used.

Preferably, the curing agent is selected such that the curing agent is a thermally activatable curing agent, and therefore the crosslinking temperature T90 of the system is preferably above 70° C., in particular above 100° C. The crosslinking temperature T90 is defined as the temperature at which 90% of the crosslinking of the material is achieved within 12 minutes. The crosslinking temperature T90 and the degree of crosslinking can be determined by means of a rheometer measurement, as with a Monsanto Rheometer 100 S (principle: oscillating disc at a deflection angle of 3°, approx. 15 cm3 chamber volume) according to DIN 53529.

The proportion of the reactive binder in the total composition can generally be within the range of from 2 to 65 wt. %. However, the proportion of the binder can vary widely, depending on the system used. Preferred reactive binders of the compositions are selected from the group of epoxides, rubbers, peroxidically crosslinkable polymers or triglyceride fractions comprising unsaturated fatty acids.

A preferred subject therefore contains epoxides as the reactive binder. A plurality of polyepoxides having at least two 1,2 epoxy groups per molecule are suitable as epoxy resins. The epoxide equivalent of these polyepoxides can vary between 150 and 50,000, preferably between 170 and 5,000. In principle, the polyepoxides may be saturated, unsaturated, cyclic or acyclic, aliphatic, alicyclic, aromatic or heterocyclic polyepoxide compounds. Examples of suitable polyepoxides include polyglycidyl ethers prepared by reacting epichlorohydrin or epibromohydrin with a polyphenol in the presence of an alkali. Polyphenols suitable for this are, for example, resorcinol, pyrocatechol, hydroquinone, bisphenol A (bis-(4-hydroxy-phenyl)-2,2-propane)), bisphenol F (bis(4-hydroxyphenyl)methane), bis(4-hydroxyphenyl)-1,1-isobutane, 4,4'-dihydroxybenzophenone, bis(4-hydroxyphenyl)-1,1-ethane and 1,5-hydroxynaphthalene. Other polyphenols that are suitable as the basis for polyglycidyl ethers are the known condensation products of phenol and formaldehyde or acetaldehyde of the novolac resin type.

Other polyepoxides that are in principle suitable are the polyglycidyl ethers of polyalcohols or diamines. These polyglycidyl ethers are derived from polyalcohols such as ethylene glycol, diethylene glycol, triethylene glycol, 1,2-propylene glycol, 1,4-butylene glycol, triethylene glycol, 1,5-pentanediol, 1,6-hexanediol or trimethylolpropane.

Other polyepoxides are polyglycidyl esters of polycarboxylic acids, for example reaction products of glycidol or epichlorohydrin with aliphatic or aromatic polycarboxylic acids such as oxalic acid, succinic acid, glutaric acid, terephthalic acid or dimer fatty acid.

Other epoxides are derived from the epoxidation products of olefinically unsaturated cycloaliphatic compounds or from native oils and fats.

Guanidines, substituted guanidines, substituted ureas, melamine resins, guanamine derivatives, cyclic tertiary amines, aromatic amines and/or mixtures thereof can be used as thermally activatable or latent curing agents for the epoxy resin binder system consisting of the aforementioned components. In this case, the curing agents can be stoichiometrically involved in the curing reaction. However, they may also have a catalytic effect. Examples of substituted guanidines are methylguanidine, dimethylguanidine, trimethylguanidine, tetramethylguanidine, methylisobiguanidine, dimethylisobiguanidine, tetramethylisobiguanidine, hexamethylisobiguanidine, heptamethylisobiguanidine, and more particularly cyanoguanidine (dicyandiamide). Representatives of suitable guanamine derivatives which may be mentioned are alkylated benzoguanamine resins, benzoguanamine resins or methoxymethyl-ethoxymethyl benzoguanamine. For monocomponent, heat-curing shaped bodies, the selection criterion is the low solubility of these substances at room temperature in the resin system, such that solid, finely ground curing agents are preferred in this case. Dicyandiamide is particularly suitable. Good storage stability of the heat-curing shaped bodies is thereby ensured.

In addition to or instead of the aforementioned curing agents, substituted ureas that have a catalytic effect can be used. These are in particular p-chlorophenyl-N,N-dimethylurea (monuron), 3-phenyl-1,1-dimethylurea (fenuron) or 3,4-dichlorophenyl-N,N-dimethylurea (diuron). In principle, it is also possible to use tertiary acrylic or alkyl amines that have a catalytic effect, for example benzyldimethylamine, tris(dimethylamino)phenol, piperidine or piperidine derivatives. However, these are often too soluble in the adhesive system, such that the monocomponent system is not suitably storage stable. Furthermore, various, preferably solid imidazole derivatives can be used as accelerators that have a catalytic effect. Representatives which may be mentioned are 2-ethyl-2-methyl imidazole, N-butyl imidazole, benzimidazole and N—C1-12 alkyl imidazoles or N-aryl imidazoles. Particularly preferred is the use of a combination of a curing agent and an accelerator in the form of "accelerated" dicyandiamides in a finely ground form. This means that it is superfluous to separately add accelerators that have a catalytic effect to the epoxide curing system.

In order to improve shock resistance, one or more "impact modifiers" may also be present, which are known in the prior art for this purpose. Examples are thermoplastic resins that preferably bear groups that are reactive to epoxy groups. Natural or synthetic rubbers are also suitable for this purpose. Specific examples of these can be found in paragraphs [27] and [28] (pages 6 and 7) of WO 2007/004184.

In a further preferred subject, the composition contains at least one reactive binder based on natural and/or synthetic rubbers. In addition to the reactive binders based on natural and/or synthetic rubbers (i.e. elastomers containing an olefinic double bond), the composition preferably contains at least one vulcanizing agent. In a preferred embodiment based on natural and/or synthetic rubbers, the composition contains, as a binder and curing agent:

5-50 wt. % of at least one polyene, in particular a liquid polyene preferably having a molecular weight Mw below 20,000, and a vulcanizing system consisting of sulfur and one or more organic accelerators and/or metal oxides.

In this case, liquid rubbers or elastomers can be selected from the following group of homopolymers and/or copolymers:

polybutadienes, in particular 1,4-polybutadiene and 1,2-polybutadiene, polybutenes, polyisobutylenes, 1,4-polyisoprene and 3,4-polyisoprene, styrene-butadiene copolymers, butadiene-acrylonitrile copolymers, it being possible for these polymers to have terminal and/or (randomly distributed) pendant functional groups. Examples of functional groups of this kind are hydroxy, amino, carboxyl, carboxylic anhydride or epoxy groups. The weight-average molecular weight Mw of these liquid rubbers is typically below 20,000 g/mol, preferably between 900 and 10,000 (measured by means of GPC against a polystyrene standard).

In this case, the proportion of liquid rubber in the total composition is dependent on the desired rheology of the uncured composition and the desired mechanical properties of the cured composition. The proportion of liquid rubber or elastomer normally varies between 5 and 50 wt. % of the total formulation. It has been found to be expedient to preferably use mixtures of liquid rubbers having a different molecular weight and different configuration in relation to the remaining double bonds. In order to achieve optimum adhesion to the various substrates, a proportion of a liquid rubber component having hydroxyl groups and/or acid anhydride groups, in particular maleic anhydride groups, is used in the particularly preferred formulations. At least one of the liquid rubbers should have a high proportion of cis-1,4 double bonds, and another liquid rubber should have a high proportion of vinyl double bonds.

In addition to the liquid polyene, up to 10 wt. %, in particular 1-10 wt. %, of at least one solid rubber may preferably also be contained in the compositions. By comparison with the liquid rubbers, suitable solid rubbers have a significantly higher molecular weight (Mw=100,000 or more). Examples of suitable rubbers are polybutadiene, preferably having a very high proportion of cis-1,4 double bonds (typically above 95%), styrene butadiene rubber, butadiene acrylonitrile rubber, synthetic or natural isoprene rubber, butyl rubber or polyurethane rubber.

For the compositions based on natural and/or synthetic rubbers, a plurality of vulcanizing systems based on elemental sulfur and vulcanizing systems not containing elemental sulfur are suitable, vulcanizing systems based on thiuram disulfides and peroxides belonging to the group of systems not containing elemental sulfur. Vulcanizing systems based on elemental sulfur, organic vulcanization accelerators and zinc compounds are particularly preferred. In this case, the powdered sulfur is used in amounts of from 0.1 to 15 wt. %, based on the total composition, and particularly preferably amounts of between 0.2 and 8 wt. %, more particularly preferably between 1 and 4 wt. %, are used. Dithiocarbamates (in the form of ammonium or metal salts thereof), xanthogenates, thiuram compounds (monosulfides and disulfides), thiazole compounds, aldehyde/amine accelerators (e.g. hexamethylenetetramine) and guanidine accelerators are suitable as organic accelerators, dibenzothiazyl disulfide (MBTS) being very particularly preferably used. A combined vulcanizing system consisting of elemental sulfur, the above-mentioned accelerators and a quinone oxime, such as p-benzoquinone dioxime, or a nitrosobenzene compound, such as p-dinitrosobenzene, is preferably also used. The organic accelerators are used in amounts of between 0.5 and 8 wt. %, based on the total formulation, preferably between 1 and 3 wt. %. The zinc compounds acting as accelerators can be selected from the zinc salts of fatty acids, zinc dithiocarbamates, basic zinc carbonates and in particular fine-particle zinc oxide. The content of zinc compounds is in the range of between 0.5 and 10 wt. %, preferably between 1 and 5 wt. %. In addition, other typical rubber vulcanizing auxiliary agents, such as fatty acids (e.g. stearic acid), may also be present in the formulation.

The vulcanizing system may however also be free of elemental sulfur. For example, peroxides, preferably organic peroxides, can be used as the vulcanizing system. Examples and preferred peroxides are those mentioned below. The amounts for use of the peroxides are preferably: 0.3-4.5 wt. %, based on the total composition.

Although these compositions generally already have very good adhesion to substrates owing to the content of liquid rubber having functional groups, tackifiers and/or adhesion promoters can be added if necessary. Hydrocarbon resins, phenol resins, terpene phenol resins, resorcinol resins or derivatives thereof, modified or unmodified resin acids or esters (abietic acid derivatives), polyamines, polyaminoamides, anhydrides and anhydride-containing copolymers, for example, are suitable for this purpose. Adding polyepoxide resins in low amounts (<1 wt. %) can also improve adhesion in the case of some substrates. For this purpose, however, the solid epoxy resins having a molecular weight of significantly higher than 700 are preferably used in a finely ground form, such that the formulations are nevertheless substantially free of epoxy resins, in particular those having a molecular weight of below 700. If tackifiers and/or adhesion promoters are used, the type and amount thereof is dependent on the polymer composition of the adhesive/sealant, on the desired strength of the cured composition, and on the substrate to which the composition is applied. Typical tackifying resins (tackifiers), such as terpene phenol resins or resin acid derivatives, are normally used in concentrations of between 5 and 20 wt. %, and typical adhesion promoters, such as polyamines, polyaminoamides or resorcinol derivatives, are used in the range of between 0.1 and 10 wt. %.

In a further preferred embodiment of the compositions based on natural and/or synthetic rubbers, the composition contains as a binder and curing agent:

15 to 70 wt. %, preferably 20 to 40 wt. %, of at least one thermoplastic elastomer, preferably a styrene-butadiene or styrene-isoprene block copolymer;

5 to 40 wt. %, preferably 10 to 20 wt. %, of at least one non-elastomeric thermoplastic polymer (preferably an ethylene-vinyl acetate or ethylene-methyl acrylate copolymer); and 0.1 to 4 wt. % of one or more vulcanizing agents, the above-mentioned agents being preferred, in particular sulfur.

A thermoplastic elastomer is preferably used of which the softening point is no higher than the temperature at which the blowing agent begins to be activated; the softening point is preferably at least approximately 30° C. lower than the activation temperature of the blowing agent. The softening point is determined by means of DSC.

The thermoplastic elastomer is preferably selected from the group consisting of thermoplastic polyurethanes (TPU) and block copolymers (including both linear and radial block copolymers) of the A-B, A-B-A, A-(B-A)n-B and (A-B)n-Y types, where A is an aromatic polyvinyl ("hard") block and the B block is a rubber-like ("soft") block of polybutadiene, polyisoprene or the like, which may be partially hydrogenated or is completely hydrogenated, Y is a polyfunctional compound, and n is an integer of at least 3. The hydrogenation of the B-block removes double bonds that were initially present and increases the thermal stability of the block copolymer. However, there is preferably no hydrogenation.

Suitable block copolymers include, but are not limited to, SBS (styrene-butadiene-styrene) copolymers, SIS (styrene-isoprene-styrene) copolymers, SEPS (styrene-ethylene-propylene-styrene) copolymers, SEEPS (styrene-ethylene-ethylene-propylene-styrene) or SEBS (styrene-ethylene-butadiene-styrene) copolymers. Particularly suitable block copolymers are styrene-isoprene-styrene triblock polymers, and completely or partially hydrogenated derivatives thereof, the polyisoprene block preferably containing a relatively high number of monomer units, derived from isoprene, in a 1,2 and/or 3,4 configuration.

Preferably, at least approximately 50% of the polymerized isoprene monomer units are contained in the polymer in a 1,2 and/or 3,4 configuration, the rest of the isoprene units having a 1-4 configuration. Block copolymers of this kind are available, for example, from Kuraray Co., Ltd. under the trade name HYBRAR.

In certain preferred embodiments of the invention, the "hard" blocks have a proportion by weight of approximately 15 to approximately 30 wt. % of the block copolymer, and the "soft" blocks have a proportion by weight of approximately 70 to approximately 85 wt. % of the block copolymer.

The glass transition temperature of the "soft" blocks is preferably approximately −80° C. to approximately 10° C., whereas the glass transition temperature of the "hard" blocks is preferably approximately 90° C. to approximately 110° C. The melt flow index of the block copolymer is preferably approximately 0.5 to approximately 6 g/10 min (measured in accordance with ASTM D1238, 190° C., 2.16 kg). The block copolymer preferably has a number-average molecular weight of approximately 30,000 to approximately 300,000, measured by means of GPC against a polystyrene standard. Thermoplastic polyurethanes (TPU) can also be used as thermoplastic elastomers, and so too can other block copolymers containing hard and soft segments, such as polystyrene-polydimethylsiloxane block copolymers, polysulfone-polydimethylsiloxane block copolymers, polyester-polyether block copolymers (e.g. copolyesters such as those consisting of dimethyl terephthalate, poly(tetramethylene oxide)glycol and tetramethylene glycol), polycarbonate-polydimethylsiloxane block copolymers and polycarbonate-polyether block copolymers. Thermoplastic elastomers that are not block copolymers are generally finely interdispersed multiphase systems or alloys and can also be used, including mixtures of polypropylene with ethylene propylene rubber (EPR) or ethylene propylene diene monomer rubber (EPDM).

In this embodiment involving one or more thermoplastic elastomers, the expandable material preferably contains one or more non-elastomeric thermoplastic polymers. In this case, the non-elastomeric thermoplastic polymer is selected, inter alia, in order to improve the adhesion properties and workability of the expandable composition.

Generally, it is desirable for a non-elastomeric thermoplastic polymer to be used of which the softening point is no higher than the temperature at which the blowing agent begins to be activated, which softening point is preferably at least approximately 30° C. lower than said activation temperature.

The particularly preferred non-elastomeric thermoplastic polymers include olefin polymers, in particular copolymers of olefins (e.g. ethylene) having non-olefinic monomers (e.g. vinyl esters, such as vinyl acetate and vinyl propionate, (meth)acrylate esters, such as C1 to C6 alkyl esters of acrylic acid and methacrylic acid), ethylene-vinyl acetate copolymers (specifically copolymers having a proportion of approximately 16 to 35 wt. % of vinyl acetate) and ethylene-methyl acrylate copolymers (in particular copolymers having a proportion of approximately 15 to approximately 35 wt. % of methyl acrylate).

In certain configurations of this embodiment, the weight ratio of the thermoplastic elastomer to the non-elastomeric thermoplastic polymer is at least 0.5:1 or at least 1:1 and/or no more than 5:1 or 2.5:1.

The tackifying resin can be selected from the group consisting of colophony, terpene resins, terpene phenol resins, hydrocarbon resins, aromatic tackifying resins originating from cracked crude oil distillates, tall oil, ketone resins and aldehyde resins. Suitable colophony resins are in particular those consisting of abietic acid, levopimaric acid, neoabietic acid, dextropimaric acid, palustric acid, alkyl esters of the aforementioned resin acids and hydrogenated products of resin acid derivatives.

Examples of suitable plasticizers are alkyl esters of dibasic acids (e.g. phthalate esters), diaryl ethers, benzoates of polyalkylene glycols, organic phosphates and alkyl sulfonic acid esters of phenol or kresol.

A further preferred subject of the invention contains at least one peroxidically crosslinkable polymer as a binder system and at least one peroxide as a curing agent.

In principle, all thermoplastic polymers and thermoplastic elastomers that can be peroxidically crosslinked can be used as peroxidically crosslinkable polymers. A person skilled in the art uses the expression "peroxidically crosslinkable" to refer to polymers in which a hydrogen atom can be abstracted from the main chain or a side chain upon action of a radical initiator, such that a radical is left behind that acts on other polymer chains in a second reaction step.

In a preferred embodiment, the at least one peroxidically crosslinkable polymer is selected from styrene-butadiene block copolymers, styrene-isoprene block copolymers, ethylene-vinyl acetate copolymers, functionalized ethylene-vinyl acetate copolymers, functionalized ethylene-butyl acrylate copolymers, ethylene-methyl acrylate copolymers, ethylene-ethyl acrylate copolymers, ethylene-butyl acrylate copolymers, ethylene-(meth)acrylic acid copolymers, ethylene-2-ethylhexyl acrylate copolymers, ethylene-acryl ester copolymers and polyolefins, such as polyethylene or polypropylene.

According to the invention, a "functionalized copolymer" is understood to be a copolymer which is provided with additional hydroxide groups, carboxyl groups, anhydride groups, acrylate groups and/or glycidyl methacrylate groups.

Within the meaning of the present invention, ethylene-vinyl acetate copolymers, functionalized ethylene-vinyl acetate copolymers, functionalized ethylene-butyl acrylate copolymers, ethylene-propylene-diene copolymers, styrene-butadiene block copolymers, styrene-isoprene block copolymers, ethylene-methyl acrylate copolymers, ethylene-ethyl acrylate copolymers, ethylene-butyl acrylate copolymers and ethylene-(meth)acrylic acid copolymers are particularly advantageous.

Particularly good adhesion properties can be achieved, in particular on an oiled plate, if thermally curable preparations according to the invention are used which contain one or more ethylene-vinyl acetate copolymers as solely peroxidically curable polymers, i.e. excluding the ethylene-vinyl acetate copolymers, the thermally curable preparations are substantially free of further peroxidically curable polymers.

According to the invention, thermally expandable preparations are "substantially free of further peroxidically curable polymers" when they contain less than 3 wt. %, preferably less than 1.5 wt. %, more particularly preferably less than 0.5 wt. %, of a peroxidically crosslinkable polymer which is not an ethylene-vinyl acetate copolymer.

Thermally expandable preparations which contain at least one ethylene-vinyl acetate copolymer having a vinyl acetate proportion of from 9 to 30 wt. %, in particular from 15 to 20 wt. %, more particularly from 17.5 to 19 wt. %, based on the total weight of the copolymer, are particularly preferred according to the invention.

Furthermore, it has been found to be advantageous for the thermally expandable preparation to contain a peroxidically crosslinkable polymer, in particular an ethylene-vinyl acetate copolymer, having a melt flow index of from 0.3 to 400 g/10 min, in particular from 0.5 to 45 g/10 min. Peroxidically crosslinkable polymers, in particular ethylene-vinyl acetate copolymers, having a melt flow index of from 1.5 to 25 g/10 min, in particular from 2 to 10 g/10 min, more particularly from 2 to 8 g/10 min are advantageous. According to the invention, it can be advantageous for two or more polymers having different melt flow indices to be used in the thermally expandable preparations.

For this purpose, the melt flow index is determined in a capillary rheometer, the polymer being melted at 190° C. in a heatable barrel and being pushed through a defined extruder die (capillary) at a pressure produced by the bearing load (2.16 kg) (ASTM D1238). What is measured is the weight of material that extrudes from the die as a function of time.

The thermally expandable preparations preferably contain at least 30 wt. % of at least one peroxidically crosslinkable polymer. Particularly preferred are thermally expandable preparations that contain from 40 to 90 wt. %, in particular from 50 to 80 wt. %, of at least one peroxidically crosslinkable polymer, based in each case on the total weight of the composition.

In addition to the peroxidically crosslinkable polymers, the thermally expandable preparations may also preferably contain, as a further constituent, at least one low-molecular multifunctional acrylate.

A "low-molecular multifunctional acrylate" is understood to be a compound which has at least two acrylate groups and a molar weight of below 2,400 g/mol, preferably below 800 g/mol. Compounds in particular that have two, three or more acrylate groups per molecule have been found to be advantageous.

Preferred difunctional acrylates are ethylene glycol dimethacrylate, diethylene glycol dimethacrylate, triethylene glycol dimethacrylate, triethylene glycol diacrylate, tripropylene glycol dimethacrylate, 1,4-butanediol-dimethacrylate, 1,3 butylene glycol dimethacrylate, 1,3-butanediol dimethacrylate, tricyclodecane dimethanol dimethacrylate, 1,10-dodecanediol dimethacrylate, 1,6-hexanediol dimethacrylate, 2-methyl-1,8-octanediol dimethacrylate, 1,9-nonanediol dimethacrylate, neopentyl glycol dimethacrylate and polybutylene glycol dimethacrylate.

Preferred low-molecular acrylates having three or more acrylate groups are glycerol triacrylate, dipentaerythritol hexaacrylate, pentaerythritol triacrylate (TMM), tetramethylolmethane tetraacrylate (TMMT), trimethylolpropane triacrylate (TMPTA), pentaerythritol trimethacrylate, di(trimethylolpropane) tetraacrylate (TMPA), pentaerythritol tetraacrylate, trimethylolpropane trimethacrylate (TMPTMA), tri(2-acryloxyethyl)isocyanurate and tri(2-methacryloxyethyl)trimellitate and the ethoxylated and propoxylated derivatives thereof having a content of a maximum of 35 EO units and/or a maximum of 20 PO units.

According to the invention, very particularly preferred are thermally expandable preparations that contain a low-molecular multifunctional acrylate selected from triethylene glycol diacrylate, triethylene glycol dimethacrylate, trimethylolpropane triacrylate (TMPTA) and trimethylolpropane trimethacrylate (TMPTMA), pentaerythritol triacrylate (TMM), tetramethylolmethane tetraacrylate (TMMT), pentaerythritol trimethacrylate, di(trimethylolpropane)tetraacrylate (TMPA) and pentaerythritol tetraacrylate.

In addition to the low-molecular acrylates, the thermally expandable preparations may contain further co-crosslinking agents, such as allyl compounds, for example triallyl cyanurate, triallyl isocyanurate triallyl trimesate, triallyl trimellitate (TATM), tetraallyl pyromellitate, the diallyl esters of 1,1,3-trimethyl-5-carboxy-3-(4-carboxyphenyl)indene, trimethylolpropane trimellitate (TMPTM) or phenylene dimaleimide.

It has been found to be particularly advantageous for the thermally expandable preparations to contain at least one low-molecular multifunctional acrylate selected from triethylene glycol diacrylate, trimethylolpropane triacrylate (TMPTA) and trimethylolpropane trimethacrylate (TMPTMA).

The low-molecular multifunctional acrylates are contained in the thermally expandable preparations preferably in an amount of from 0.2 to 2.5 wt. %, in particular from 0.4 to 1.4 wt. %, based in each case on the total weight of the thermally expandable preparation.

As a curing agent system for the peroxidically crosslinkable polymers, the thermally expandable preparations preferably contain at least one peroxide. In particular, organic peroxides are suitable, for example ketone peroxides, diacyl peroxides, peresters, perketals and hydrogen peroxides. Particularly preferred are for example cumene hydroperoxide, t-butyl peroxide, bis(tert-butylperoxy)-diisopropylbenzene, di(tert-butylperoxyisopropyl)benzene, dicumyl peroxide, t-butyl peroxybenzoate, dialkyl peroxydicarbonate, diperoxy ketals (e.g. 1,1-di-tert-butylperoxy-3,3,5-trimethylcyclohexane), ketone peroxides (e.g. methyl ethyl ketone peroxides) and 4,4-di-tert-butylperoxy-n-butyl-valerates.

Examples of peroxides commercially marketed by Akzo Nobel are particularly preferred, such as 3,3,5,7,7-pentamethyl-1,2,4-trioxepane, 2,5-dimethyl-2,5-di(tert-butylperoxy)hex-3-yne, di-tert-butyl peroxide, 2,5-dimethyl-2,5-di(tert-butylperoxy)hexane, tert-butyl cumyl peroxide, di-(tert-butylperoxyisopropyl)benzene, dicumyl peroxide, butyl-4,4-di(tert-butylperoxi)valerate, tert-butylperoxy-2-ethylhexyl carbonate, 1,1-di-(tert-butylperoxy)-3,3,5-trimethylcyclohexane, tert-butyl peroxybenzoate, di-(4-methylbenzoyl)peroxide and dibenzoyl peroxide.

It has also been found to be advantageous for the peroxides used to be substantially inert at room temperature and to be activated only when heated to relatively high temperatures (for example when heated to temperatures of between 130° C. and 240° C.). It is particularly advantageous for the peroxide used to have a half-life of more than 60 minutes at 65° C., i.e. after the thermally expandable preparation containing the peroxide has been heated to 65° C. for 60 minutes, less than half of the peroxide used has decomposed. According to the invention, peroxides of this kind that have a half-life of 60 minutes at 115° C. may be particularly preferred.

At least one peroxide selected from the group of di(tert-butylperoxyisopropyl)benzene, dicumyl peroxide, 1,1-di-(tert-butylperoxy)-3,3,5-trimethylcyclohexane, dibenzoyl peroxide and di-tert-butyl-1,1,4,4-tetramethylbut-2-in-1,4-ylendiperoxide is particularly preferably contained.

According to the invention, it is also advantageous for at least one peroxide or the peroxides to be used when applied to a solid inert carrier, such as calcium carbonate and/or silica and/or kaolin.

Preferably, the peroxide is selected such that the crosslinking temperature T90 is below, preferably 15 to 35° C. below, the decomposition temperature of the endothermic blowing agent. This ensures a high gas yield and thus a high degree of expansion of the material. Examples would be a peroxide (T90=105° C.) with a sodium bicarbonate start decomposition temperature of 130° C. or a peroxide (T90=170° C.) with a citric acid start decomposition temperature of 195° C. The crosslinking temperature T90 is defined as the temperature at which 90% of the crosslinking of the material is achieved within 12 minutes.

The at least one peroxide or the peroxides is/are contained in the thermally expandable preparations according to the invention preferably in an amount of from 0.2 to 2 wt. %, in particular in an amount of from 0.5 to 1.3 wt. %, the active substance content of peroxide being based in each case on the total weight of the thermally expandable preparation.

Furthermore, it is advantageous for the weight ratio of the at least one peroxide to the at least one low-molecular multifunctional acrylate to be at least 1:3. A weight ratio of at least 1:3 is always achieved according to the invention if the formulation contains at most 3 g of the low-molecular multifunctional acrylate, based on 1 g of peroxide. A weight ratio of at least 1:2.5, in particular at least 1:1.6, is particularly preferred.

By selecting this weight ratio, it is possible according to the invention for the connection, i.e. adhesion, to the opposite plate to be improved. It has been found that the thermally expandable preparations according to the invention have improved adhesion in particular in narrow regions of the system to be sealed, since the foam itself penetrates the smallest of corners and at acute angles, and therefore it is possible for the system to be sealed in a more complete manner.

The present invention very particularly preferably relates to compositions which comprise, as a binder and curing agent,
at least one triglyceride fraction of which the fatty acid distribution has a proportion of at least 5 wt. %, in particular at least 60 wt. %, of one or more Ω-3 fatty acids and/or one or more Ω-6 fatty acids,
at least one vulcanizing agent selected from the group consisting of
sulfur,
peroxidic vulcanizing agents,
quinones and/or quinone dioximes, and/or
dinitrosobenzolene; and
optionally at least one synthetic polymer that contains at least one C=C double bond and/or at least one C≡C triple bond.

The at least one triglyceride fraction has a fatty acid distribution having a proportion of at least 5 wt. %, in particular at least 10 wt. %, more particularly preferably at least 60 wt. %, of one or more Ω-3 fatty acids and/or one or more Ω-6 fatty acids.

According to the invention, a "triglyceride fraction" is understood to be the sum of all triglycerides contained in the preparation, that is to say the triple ester of glycerol comprising three fatty acid molecules. It makes no difference to the determination of the triglyceride fraction from which raw material used the triglycerides originate.

According to the invention, the fatty acid distribution of a triglyceride fraction indicates the weight proportions of the various fatty acids relative to the total weight of the fatty acids in the triglyceride fraction; the different proportions are usually determined by gas chromatography after the fatty acids have been released as methyl esters. Accordingly, the weight of glycerol is not included in this calculation.

Ω-3 fatty acids which are preferred according to the invention are: hexadecatrienoic acid (16:3; (ω-3)), alpha-linolenic acid (18:3 (ω-3)), stearidonic acid (18:4; (ω-3)), eicosatrienoic acid (20:3; (ω-3)), eicosatetraenoic acid (20:4; (ω-3)), eicosapentaenoic acid (20:5; (ω-3)), heneicosapentaenoic acid (21:5; (ω-3)), docosapentaenoic acid (22:5; (ω-3)), docosahexaenoic acid (22:6; (ω-3)), tetracosapentaenoic acid (24:5; (ω-3)) and tetracosahexaenoic acid (24:6; (ω-3)). Very particularly preferred Ω-3 fatty acids are alpha-linolenic acid (18:3 (ω-3)) and eicosapentaenoic acid (20:5; (ω-3)). Alpha-linolenic acid (18:3 (ω-3)) is a very particularly preferred Ω-3 fatty acid.

Ω-6 fatty acids which are preferred according to the invention are: linoleic acid (18:2; (ω-6)), gamma-linolenic acid (18:3; (ω-6)), calendic acid (18:3; (ω-6)), eicosadienoic acid (20:2; (ω-6)), dihomo-gamma-linolenic acid (20:3; (ω-6)), arachidonic acid (20:4; (ω-6)), docosadienoic acid (22:2; (ω-6)), docosatetraenoic acid (22:4; (ω-6)), docosapentaenoic acid (22:5; (ω-6)), tetracosatetraenoic acid (24:4; (ω-6)) and tetracosapentaenoic acid (24:5; (ω-6)).

Particularly preferred Ω-6 fatty acids are linoleic acid (18:2; (ω-6)), gamma-linolenic acid (18:3; (ω-6)) and arachidonic acid (20:4; (ω-6)), linoleic acid (18:2 (ω-6)) being a very particularly preferred Ω-6 fatty acid.

Particularly good mechanical properties could be obtained if the triglyceride fraction has a fatty acid distribution having a proportion of at least 4 wt. %, in particular at least 15 wt. %, of one or more Ω-3 fatty acids.

It has been found to be advantageous according to the invention for at least 40 wt. %, in particular 60 wt. %, very particularly 100 wt. %, of the triglyceride fraction to be liquid at 25° C., i.e. present in the form of an oil.

Furthermore, it has been found to be advantageous for the triglyceride fraction having the proportions of Ω-3 fatty acids and/or Ω-6 fatty acids to originate from a natural source, for example corresponding vegetable and/or animal oils. Although vegetable oils are particularly preferred, the use of animal oils, such as fish oil or cod liver oil, is also covered.

Triglyceride fractions according to the invention are contained, for example, in sunflower oil, rapeseed oil, soybean oil, tall oil, camelina oil, tung oil, linseed oil and/or hemp oil. Rapeseed oil, soybean oil, tall oil, camelina oil, tung oil, linseed oil and/or hemp oil are preferred according to the invention; tall oil, camelina oil, tung oil, linseed oil and/or hemp oil are particularly preferred according to the invention; tung oil, linseed oil and hemp oil are more particularly preferred according to the invention. The use of linseed oil is very particularly preferred. The use of a combination of two, three or more suitable oils is also preferred.

The triglyceride fraction, or the oil containing the triglyceride fraction, is contained in the compositions according to the invention preferably in an amount of from 5 to 50 wt. %, in particular from 10 to 40 wt. %.

As a curing agent for the triglyceride fraction, the compositions preferably contain at least one specially selected vulcanizing system selected from the group consisting of:
(b1) sulfur,
(b2) peroxide vulcanizing systems,
(b3) quinones and/or quinone dioximes, and/or
(b4) dinitrosobenzenes.

In a first preferred embodiment, synthetic or natural sulfur is used as the vulcanizing agent. Preferably, powdered sulfur is used according to the invention; however, in order to prevent dust pollution during production, it may also be preferable to use sulfur mixed with a dust-binding agent, for example mixed with mineral oil, paraffin oil or silicon dioxide. The content of the dust-binding oils may well be selected such that a sulfur-containing paste is used as a raw material. Sulfur is preferably used in the S8 configuration.

The active substance content of sulfur in the preparations according to the invention can vary within wide limits; it can be up to 20 wt. %, preferably up to approximately 15 wt. %, in particular up to 10 wt. %, based in each case on the total preparation; the lower limit should preferably be no less than 0.5 wt. %. The sulfur content is dependent on the reactivity of the system used and possibly on the use of polymerization additives.

In a second preferred embodiment, radical vulcanizing agents based on organic or inorganic peroxides are used. Examples of peroxides which are preferred according to the invention are diacetyl peroxide, di-tert-butyl peroxide, dicumyl peroxide and dibenzoyl peroxide. The peroxides are contained in the preparations according to the invention, as vulcanizing agents, in amounts of from 0.2 wt. % to 3 wt. %.

In a third preferred embodiment, quinones and/or quinone dioximes are used as vulcanizing agents. A particularly preferred representative of this group is p-benzoquinone dioxime. The quinones and/or quinone dioximes are used in the compositions preferably in concentrations of from 0.2 wt. % to 5 wt. %.

These quinone-based vulcanizing agents are preferably used in a phlegmatized and paste form, for example when mixed with substances such as mineral oils, the active substance content usually being 40 wt. % and 70 wt. %, respectively.

Sulfur is a very particularly preferred vulcanizing agent as a curing agent for the triglyceride fraction.

In a fourth preferred embodiment, dinitrosobenzenes, in particular 1,4-dinitrosobenzene, are used as vulcanizing agents. This substance group is preferably used in the preparations according to the invention in a concentration of from 0.2 wt. % to 5 wt. %, based in each case on the entire heat-curable preparation.

It has been found to be particularly advantageous, regardless of the specific embodiment, for the vulcanizing agent to be used in combination with organic curing accelerators, such as mercaptobenzothiazole, dithiocarbamates, sulfenamides, disulfides such as dibenzothiazole disulfide and/or thiuram disulfides, aldehyde-amine accelerators, guanidines, and/or metal oxides such as zinc oxide. In addition, typical rubber vulcanizing auxiliary agents, such as fatty acids (for example stearic acid), may also be present in the formulation.

The content of the organic curing accelerator may preferably vary between 0 and approximately 10 wt. %. The content of metal oxides is preferably also in the range between 0 and 10 wt. %.

Furthermore, it has been found to be advantageous for the heat-curable preparations to also comprise, in addition to the unsaturated triglyceride fraction, at least one synthetic polymer that contains at least one C=C double bond and/or at least one C≡C triple bond. These polymers are preferably selected from the following group of homopolymers and/or copolymers:

polybutadienes, in particular 1,4-polybutadiene and 1,2-polybutadiene,
polybutenes,
polyisobutylenes,
1,4-polyisoprenes,
styrene-butadiene copolymers and
butadiene acrylonitrile copolymers, it being possible for these polymers to have terminal and/or (randomly distributed) pendant functional groups. Examples of functional groups of this kind are hydroxy, carboxyl, carboxylic anhydride or epoxy groups, in particular maleic anhydride groups. These polymers can be selected in particular from the above-mentioned polyenes and be present in the same amounts.

The compositions according to the invention further contain a thermally activatable blowing agent. Suitable thermally activatable blowing agents are, in principle, all known blowing agents, for example "chemical blowing agents" which release gases upon decomposition when subject to thermal treatment, or "physical blowing agents," i.e. in particular thermally expandable hollow spheres.

"Chemical blowing agents" are understood to be compounds according to the invention that decompose upon the action of heat and thereby release gases. Both exothermic and endothermic chemical blowing agents can be used.

Examples of suitable exothermic chemical blowing agents are azo compounds, hydrazide compounds, nitroso compounds and carbazide compounds, such as azobisisobutyronitrile, azodicarbonamide (ADCA), di-nitroso-pentamethylenetetramine, 4,4'-oxybis(benzenesulfonic acid hydrazide) (OBSH), 4-methylbenzenesulfonic acid hydrazide, azocyclohexylnitrile, azodiaminobenzene, benzene-1,3-sulfonyl hydrazide, calcium azide, 4,4'-diphenyldisulfonyl azide, diphenyl sulfone-3,3'-disulfohydrazide, benzene-1,3-disulfohydrazide, trihydrazinotriazine, p-toluenesulfonyl hydrazide and p-toluenesulfonyl semicarbazide.

According to the invention, the exothermic chemical, thermally activatable blowing agents are preferably contained in an amount of from 0.5 to 6 wt. %, in particular from 0.7 to 3 wt. %, based in each case on the total application preparation.

The compositions according to the invention may also preferably contain an endothermic chemical blowing agent, in particular selected from bicarbonates, solid, optionally functionalized, polycarboxylic acids and salts and mixtures thereof. Suitable bicarbonates (hydrogen carbonates) are those of formula $XHCO_3$, where X can be any cation, in particular an alkali metal ion, preferably Na+ or K+, Na+ being extremely preferred. Other suitable cations X+ may be selected from NH4+, ½ Zn2+, ½ Mg2+, ½ Ca2+ and mixtures thereof. Suitable polycarboxylic acids include, but without being limited thereto, solid, organic di, tri, or tetra acids, in particular hydroxy-functionalized or unsaturated di-, tri-, tetra-, or polycarboxylic acids, such as citric acid, tartaric acid, malic acid, fumaric acid and maleic acid. The use of citric acid is particularly preferred. Citric acid is therefore advantageous, inter alia, because it is an ecologically sustainable blowing agent. Particularly preferred blowing agents are sodium bicarbonate and/or citric acid/citrate; the blowing agent is very particularly preferably a mixture of sodium bicarbonate and citric acid/citrate.

In various embodiments, the compositions contain at least one endothermic chemical blowing agent in an amount of from 0.1 to 35 wt. %, preferably from 1 to 30 wt. %, more preferably from 2 to 30 wt. %, particularly preferably from 5 to 25 wt. %, very particularly preferably from 10 to 25 wt. %, based in each case on the total composition. Unless indicated otherwise, the amounts in wt. % given here are based on the total composition prior to expansion.

Expandable plastics hollow microspheres based on polyvinylidene chloride copolymers or acrylonitrile/(meth)acrylate copolymers can be used as physical blowing agents. These are commercially available, for example, under the names "Dualite®" and "Expancel®" from Pierce & Stevens and Akzo Nobel, respectively.

It may be preferable according to the invention to use, in the thermally expandable preparations, a combination of at least one chemical, thermally activatable blowing agent and at least one physical, thermally activatable blowing agent.

The amount of blowing agent is preferably selected such that the volume of the thermally expandable compound increases irreversibly, when heated to an activation temperature (or expansion temperature), by at least 5%, preferably at least 10%, and in particular at least 20%. What is meant by this is that, in addition to the normal and reversible thermal expansion according to the coefficient of thermal expansion of the compound, the volume of said compound irreversibly increases by comparison with the starting volume at room temperature (22° C.) when heated to the activation temperature in such a way that, after being cooled back down to room temperature, it is at least 5%, preferably at least 10%, and in particular at least 20%, greater than before heating. The specified degree of expansion thus refers to the volume of the compound at room temperature before and after the temporary heating to the activation temperature. The upper limit of the degree of expansion, i.e. the irreversible increase in volume, can be adjusted by selecting the amount of blowing agent such that it is less than 300%, in particular less than 200%.

The activation temperature is preferably in the range of from 120 to 220° C. This temperature should preferably be maintained for a period of time in the range of from 10 to 150 minutes.

Preferably, the adhesive composition contains from 0.1 to 15 wt. %, preferably from 0.1 to 5 wt. %, in particular from 0.1 to 2 wt. %, of the at least one thermally activatable blowing agent.

In addition, the composition contains at least one lightweight filler, wherein expanded particles of at least one glass-rich volcanic rock having a closed outer shell are used as the lightweight filler. The starting material or raw material for this lightweight filler is at least one glass-rich volcanic rock that contains bound water (e.g. water of crystallization) and is thus expandable. The rocks obsidian, vermiculite and/or pumice, preferably obsidian, more particularly preferably perlite, are suitable as the starting material or raw material. These raw materials are inexpensive and very stable, and therefore the expanded particles of at least one glass-rich volcanic rock, in particular perlite, are favorable over other lightweight fillers and are also pressure stable. Owing to their pressure stability, these particles are particularly suitable for pumpable compositions.

The expanded particles having a closed outer shell can be produced by inflating the volcanic rock, in particular perlite, in a thermal expansion process (e.g. at temperatures of from approximately 700 to approximately 1,000° C.), the glass beginning to glow and increasing in volume. In order to prevent the particles from bursting during expansion and to obtain expanded particles having a closed, preferably glass or sintered surface or having a closed-cell structure, it should be ensured that heat is distributed uniformly.

The particles according to the invention, preferably of perlite, have a closed outer shell; in particular, the particles have a closed-cell spherical structure. Owing to the closed outer shell, no binder, no other constituent of the composition, and also no water can penetrate the lightweight filler, which penetration could adversely affect the resulting properties of the composition, such as density, hardness or adhesion properties.

The expanded particles of at least one glass-rich volcanic rock having a closed outer shell, in particular the expanded perlite particles having a closed outer shell, preferably have a maximum particle size of less than 1,000 µm, in particular less than 750 µm, preferably less than 500 µm, particularly preferably less than 400 µm (determinable by means of sieve analysis, a sieve of the corresponding mesh size allowing all particles to pass through). In a preferred embodiment, the expanded particles have a weight-average particle size d50 of less than 500 µm, in particular less than 300 µm. Expanded particles having a weight-average particle size d50 of from 10 to 500 µm, in particular from 20 to 200 µm, preferably from 30 to 125 µm (determinable by means of sieve analysis) are preferred.

Particularly preferably, the expanded particles, acting as a lightweight filler, have a bulk density of less than 500 kg/m$^3$, in particular from 10 to 500 kg/m$^3$, preferably from 100 to 400 kg/m$^3$, more preferably from 200 to 270 kg/m$^3$.

Compositions containing expanded particles of the preferred sizes or bulk densities can be mixed particularly homogeneously and are particularly highly pumpable, which improves both the handling and the mechanical properties of the resulting products.

In addition, it may be preferable for the surface of the expanded particles to have been modified. In particular, the surface has functional groups, such as hydroxyl, sulfur, acid and/or acid anhydride groups. Preferably, the surface can also be silanized with organosilanes, in particular with sulfur-containing organosilanes. The silanization with sulfur-containing organosilanes can be carried out, for example, with the organosilane Si-69 from Evonik. By means of silanization or surface modification, the lightweight filler can be better integrated in the resulting binder system.

In a preferred embodiment, the composition contains, as the lightweight filler, from 1 to 35 wt. %, in particular from 2 to 25 wt. %, preferably from 3 to 20 wt. %, of at least one expanded particle of at least one glass-rich volcanic rock having a closed outer shell, preferably at least one expanded perlite having a closed outer shell, based in each case on the total composition.

In addition to the above-mentioned constituents, the thermally expandable compounds may contain further conventional components, such as fillers, plasticizers, reactive diluents, rheology auxiliary agents, wetting agents, adhesion promoters, anti-ageing agents, stabilizers, and/or dye pigments.

For example, it is preferable for the compositions according to the invention to also contain at least one antioxidant.

Although in principle the conventional synthetic antioxidants, for example sterically hindered phenols or amine derivatives, are suitable according to the invention, it has been found to be particularly advantageous within the meaning of the invention for a natural antioxidant to be used.

Examples of synthetic antioxidants which are preferred according to the invention are the products commercially available under the trade name Wngstay® and 2,2-methylene-bis-(4-methyl-6-tert-butylphenol) and 2,6-di-tert-butyl-p-cresol (3,5-di-tert-butyl-4-hydroxytoluene).

According to the invention, a natural antioxidant is understood to be a compound which can be obtained from naturally renewable raw materials. It is particularly preferable for compounds that are produced directly, i.e. without chemical modification, from natural raw materials to be used as natural antioxidants. Examples of this substance group which are preferred according to the invention are tocopherol, squalene and sesamolin. Tocopherol is very particularly preferred according to the invention.

The antioxidants, in particular the natural antioxidants, are used in the compositions according to the invention preferably in amounts of from 0.1 to 5 wt. %, in particular from 0.2 to 3 wt. %, based in each case on the total composition.

In a further embodiment, it is preferable for the compositions according to the invention to also contain at least one inorganic filler.

A first group of inorganic fillers are, for example, the various ground or precipitated chalks, calcium magnesium carbonates, calcium oxide, barite, and in particular silicate fillers of the aluminum-magnesium-calcium-silicate type, for example wollastonite or chlorite, or aluminum borosilicate glasses. Chalks are inorganic fillers that are preferred according to the invention; ground mineral chalks are very particularly preferred. Furthermore, calcium oxide is a particularly preferred inorganic filler within the meaning of the present invention. The content of calcium carbonate and/or calcium oxide, in particular calcium oxide, may preferably vary between 5 wt. % and approximately 50 wt. %, based on the total composition. In the case of calcium oxide, concentrations of from 0 to approximately 10 wt. %, in particular from 2 to 10 wt. %, based on the total composition, are preferred.

It may be expedient in some circumstances for the surface of at least some of the inorganic fillers to be pretreated; in particular, in the case of the various calcium carbonates and chalks, a coating with at least one fatty acid, in particular with stearic acid, has been found to be expedient.

A second group of inorganic fillers which can be used in the heat-curing preparations according to the invention are the sheet-like fillers. Heat-curing preparations containing at least one sheet-like filler, such as graphite, vermiculite, mica, talc or similar phyllosilicates, are particularly preferred. Graphite is a particularly preferred sheet-like filler within the meaning of the present invention. The sheet-like fillers are preferably used when a positive influence on the acoustic properties is desired. The content of sheet-like fillers may preferably be between 2 wt. % and 15 wt. %.

A third group of inorganic fillers which are preferred according to the invention are the rheology additives which can have an influence on the rheology and/or strength of the preparations. According to the invention, the rheology additives are preferably selected from silicon dioxide and/or carbon black.

According to the invention, the term "silicon dioxide" also covers the oxide forms of silicon referred to as "silicic acid" or "silica".

It may be preferable according to the invention for the preparations to contain at least one surface-modified silicon dioxide; hydrophilically modified silicon dioxide has particularly advantageous properties as a surface-modified silicon dioxide.

Surface-modified types of silicon dioxide having a specific surface area of at least 100 m2/g, in particular at least 150 m2/g (measured in each case by the BET method) are particularly preferred according to the invention.

According to the invention, carbon black is understood to be preferably industrially produced carbon black.

A content of from 0 to 5 wt. %, in particular from 0.1 to 4 wt. %, more particularly from 0.5 to 3 wt. %, of a rheology additive, preferably selected from silicon dioxide and/or carbon black, based on the total heat-curable preparation is particularly preferred.

It is preferable according to the invention for compositions to contain a combination of two or more inorganic fillers. In particular, a combination of at least one inorganic filler selected from calcium carbonate and/or calcium oxide and at least one sheet-like inorganic filler and/or at least one rheology additive is particularly preferred according to the invention.

A combination of
  at least one inorganic filler selected from calcium carbonate and/or calcium oxide,
  at least one sheet-like inorganic filler and
  at least one rheology additive
is most particularly preferred according to the invention.

The inorganic fillers are preferably used in an amount of from 10 to 70 wt. %, in particular from 30 to 60 wt. %, based in each case on the weight of the composition.

In addition to the various inorganic fillers and the lightweight fillers, the compositions according to the invention may also contain fibers. Fibers which are preferred according to the invention are selected from carbon fibers, aramid fibers, glass fibers, silicon nitride fibers, metal fibers, ceramic fibers, boron fibers, basalt fibers, polyethylene fibers, polypropylene fibers, polyester fibers and/or natural fibers, with flax and sisal fibers being particularly preferred as natural fibers.

The fibers are contained in the heat-curing preparations preferably in an amount of from 0 to 6 wt. %, in particular from 0.5 to 5 wt. %, based in each case on the total composition.

The compositions according to the invention are preferably characterized in that they can be heated reversibly (without a significant change in the temperature-dependent viscosity behavior) to temperatures of up to 70° C. and can therefore be transported by means of heated pumps and/or shaped several times within this temperature range.

In a particularly preferred embodiment, the composition is pumpable at temperatures below 70° C. According to the invention, "compositions which are pumpable at temperatures below 70° C." are understood to be compositions that could be applied to the application site, from a storage container, at temperatures below 70° C. using conventional pumps at a pressure of less than 250 bar, in particular less than 200 bar, more particularly from 6 to 180 bar. Compositions that could be applied to the application site, from a storage container, at application temperatures in the range of from 40° C. to 60° C. using conventional pumps at a pressure of less than 250 bar, in particular less than 200 bar, more particularly from 6 to 180 bar, are particularly preferred. The compositions particularly preferably have a viscosity at 25° C. of from 0.1 to 500 Pas, in particular from 1 to 250 Pas, preferably from 5 to 100 Pas. Very particularly preferably, the compositions have a viscosity at 50° C. of from 0.1 to 500 Pas, in particular from 1 to 250 Pas, preferably from 5 to 100 Pas.

Unless stated otherwise, the viscosities are determined in the context of the present application under the following measurement conditions: rotation rheometer having a plate-plate geometry (PP20); measured in oscillation at 10% deformation and a frequency of 100 rad/s; layer thickness of the material=0.2 mm.

For the compositions according to the invention which are "pumpable at temperatures below 70° C.," it is very particularly preferable for said compositions to have, at 60° C. and a pump pressure of 6 bar, a flow rate of at least 100 g/min, preferably from 150 g/min to 4,500 g/min, more preferably from 250 g/min to 3,000 g/min, when discharged from a completely filled, commercially available aluminum nozzle cartridge which has a capacity of 310 ml and an internal diameter of 46 mm, and the outlet opening of which has been opened by means of a cartridge piercing tool having an external diameter of 9 mm, without attaching a nozzle, at a temperature of 60° C. (after pre-heating for 45 minutes) and a pressure of 6 bar. The flow rate indicates the weight of preparation that can be discharged within 1 minute, and is accordingly given in g/min.

Preferably, the density of the composition is max. 2 g/cm$^3$, preferably from 0.9 to 1.5 g/cm$^3$, and more preferably from 1 to 1.2 g/cm$^3$.

In a preferred embodiment, the composition contains
(a) 2 to 65 wt. % of at least reactive binder, in particular selected from the group of epoxides, rubbers, peroxidically crosslinkable polymers or triglyceride fractions comprising unsaturated fatty acids;

(b) 0.25 to 15 wt. % of at least one curing agent and/or accelerator;
(c) 0.1 to 15 wt. % of at least one thermally activatable blowing agent, in particular a chemical blowing agent; and
(d) 1 to 35 wt. % of at least one lightweight filler, wherein at least one expanded particle of at least one glass-rich volcanic rock having a closed outer shell is contained as the lightweight filler, in particular a perlite particle.

The weight percentages refer to the entire adhesive composition, unless stated otherwise.

In a preferred embodiment, the composition contains
(a) 5 to 50 wt. % of at least one polyene, in particular a liquid polyene preferably having a molecular weight Mw below 20,000;
(b) 0.25 to 15 wt. % of a vulcanizing system consisting of sulfur and one or more organic accelerators and/or metal oxides;
(c) 0.1 to 15 wt. % of at least one thermally activatable blowing agent, in particular a chemical blowing agent; and
(d) 1 to 35 wt. % of at least one lightweight filler, wherein at least one expanded particle of at least one glass-rich volcanic rock having a closed outer shell is contained as the lightweight filler, in particular a perlite particle.

In another preferred embodiment, the composition contains
(a) 5 to 50 wt. % of at least one triglyceride fraction of which the fatty acid distribution has a proportion of at least 5 wt. %, in particular of at least 60 wt. %, of one or more Ω-3 fatty acids and/or one or more Ω-6 fatty acids, in particular linseed oil; optionally 5 to 50 wt. % of at least one synthetic polymer which comprises at least one C=C double bond and/or at least one C≡C triple bond, in particular a liquid polybutadiene;
(b) 0.1 to 15 wt. % of a vulcanizing system of at least one vulcanizing agent selected from the group consisting of sulfur,
peroxidic vulcanizing agents,
quinones and/or quinone dioximes, and/or
dinitrosobenzolene;
(a) 0.1 to 15 wt. % of at least one thermally activatable blowing agent, in particular a chemical blowing agent; and
(b) 1 to 35 wt. % of at least one lightweight filler, wherein at least one expanded particle of at least one glass-rich volcanic rock having a closed outer shell is contained as the lightweight filler, in particular a perlite particle.

These preferred compositions preferably contain all the other constituents mentioned above, either alone or in combination, in the correspondingly preferred amounts.

The compositions according to the invention can be prepared by mixing the selected components in any suitable mixer, for example a dispersion mixer, a planetary mixer, a twin-screw mixer, a continuous mixer or an extruder, in particular a twin-screw extruder.

Although it can be advantageous to heat the components slightly to facilitate achieving a homogeneous and uniform compound, care must be taken to ensure that temperatures which cause the thermally activatable curing agent and/or the thermally activatable blowing agent to be activated are not reached.

Until they are used, the compositions according to the invention are preferably stored in nozzle cartridges or barrels, such as sealed drums.

At the time of use, the composition according to the invention is transported from the storage container to the application site using conventional heated pumps, and is applied at said site. Said composition can be applied to a layer thickness of 5 cm without difficulty, such that even relatively large cavities, such as tubes having a corresponding internal diameter, can easily be filled.

The composition applied expands by being heated, the preparation being heated for a particular time period and to a particular temperature which is sufficient for bringing about the activation of the blowing agent and the curing agent.

Depending on the composition of the preparation and the requirements of the production line, these temperatures are usually in the range of from 130° C. to 240° C., preferably from 150° C. to 200° C., with a holding time of from 10 to 90 minutes, preferably from 15 to 60 minutes.

In principle, the nature of the heat source is not important, and so the heat can be supplied for example by a hot air blower, by irradiation with microwaves, by magnetic induction, or by heating tongs. In the field of vehicle construction and in fields of technology involving associated production processes, it is particularly advantageous for the preparations according to the invention to expand when the component or vehicle passes through the furnace for curing the cathodic dip paint or for baking the powder coatings, and therefore a separate heating step can be dispensed with.

According to the invention, compositions having an exothermicity value of curing of less than 300 J/g, in particular less than 250 J/g, more particularly less than 220 J/g, may be preferred. According to the invention, the exothermicity value of curing is determined by means of DSC measurement in a temperature range of from 25° C. to 250° C., at a rate of heating of 5 K/min.

A further subject of the invention is a method for stiffening and/or reinforcing components which have thin-walled structures, in particular tubular structures, wherein the above-mentioned composition is applied to the surface of the structure to be reinforced at a temperature below 70° C., in particular at a pump pressure of greater than 3 bar, and said composition is cured at a later point in time at temperatures above 130° C.

According to the invention, the composition is particularly preferably applied in a temperature range of from 40° C. to 60° C.

Application at an application pressure of from 6 bar to 180 bar is also particularly preferred.

The actual curing takes place according to the invention at a "later point in time". For example, according to the invention, it is conceivable that the components to be stiffened be coated with the composition according to the invention and then put into intermediate storage. Intermediate storage may also include, for example, transportation to another plant. Such intermediate storage can last up to several weeks.

In another embodiment, however, it is also conceivable that the components to be stiffened be subject to a curing step shortly after being coated with the composition according to the invention. This may take place immediately or, in the case of assembly-line production, after the components have arrived at one of the subsequent stations. In the context of this embodiment, it is particularly preferable according to the invention for the curing step to take place within 24 h, in particular within 3 h, after the composition according to the invention has been applied.

The compositions according to the invention can be used in all products which have cavities or tube structures to be reinforced. These products are, for example, in addition to vehicles, aircraft, domestic appliances, furniture, buildings, walls, partitions or boats, and all devices having a supporting frame structure formed of tubes, for example sports equipment, mobility aids, frameworks and bicycles.

Examples of sports equipment in which the present invention can be used advantageously are bicycles, fishing nets, fishing rods, goal posts, tennis net posts, and basketball hoop structures.

According to the invention, the term "bicycle" is understood to be any usually two-wheeled, single-track vehicle driven by operating pedals.

In addition to the conventional bicycle structures in which the rider adopts a seated position, recumbent bicycles, for example, are also intended to be covered according to the invention. In addition to the conventional fixed frame, structures comprising hinges, such as folding bicycles, are also covered according to the invention. Vehicles having three or more wheels are also intended to be covered.

Furthermore, the preparations according to the invention can be used to reinforce the frame structures of mobility aids, such as wheelchairs, rollators, crutches, assistive canes or walking frames.

In the field of vehicle construction, the use of the preparations according to the invention has been found to be advantageous particularly for the construction of the driver's safety cage or the passenger compartment, since it can provide the structure with great stability and, at the same time, a low weight. The preparation according to the invention can be used advantageously in particular in the construction of all classes of racing cars (formula I, touring cars, rally vehicles, etc.).

Another preferred field of application of the present invention is the field of tools. There are no fundamental restrictions with regard to the type of tools. For example, said tools may be tradesmen's equipment, specialist tools, gardening equipment, such as spades or wheelbarrows, or kitchen equipment. Common to all these components is the fact that the preparation according to the invention makes it possible to stabilize the structure without significantly increasing the total weight.

Furthermore, the compositions according to the invention can advantageously be used to stabilize frames. According to the invention, "frames" are understood to be lateral surrounds, such as picture frames, window frames or door frames.

Another field of application is the reinforcement of all types of frameworks. In this field of application too, high stability of the accordingly reinforced structures is paramount. The frameworks in which the preparation according to the invention can be used include, for example, all types of ladders, but also construction site scaffolding, structural frameworks for exhibition stand construction, structures for concert stages, such as supporting and mounting structures used as crossbeams, and light poles for stadiums or spectator stands.

Another broad field of application is the field of street furniture. This field includes traffic light and lighting systems as well as all other structures, such as bus shelters, platform railings, seat structures, road signs, bicycle stands or crash barriers.

With regard to the further details of this subject of the present invention, what has already been said about the first subject applies, mutatis mutandis.

A third subject of the present invention is the use of a composition according to the invention for stiffening and/or reinforcing components which have thin-walled structures, in particular tubular structures.

With regard to the details of this subject of the present invention, what has already been said about the other subjects applies, mutatis mutandis.

A fourth subject of the present invention is a component which has a thin-walled structure and has been stiffened and/or reinforced with a composition according to the invention after curing.

With regard to the details of this subject of the invention too, what has already been said about the other subjects also applies, mutatis mutandis.

The invention will be demonstrated below by way of examples, but without being limited thereto.

EXAMPLES

Method:

The compositions were mixed together according to Table 1. Subsequently, the density of the composition and the viscosity at 40° C. was determined. To test the properties of the reinforcement of hollow bodies, the composition was foamed and simultaneously cured at 160° C. for 20 minutes.

TABLE 1

| Composition | 1 | 2 | 3 | 4 |
| --- | --- | --- | --- | --- |
| calcium oxide | 2 | 2 | 2 | 2 |
| antioxidant | 0.25 | 0.25 | 0.25 | 0.25 |
| precipitated $CaCO_3$ | 14 | 14 | 14 | 14 |
| ground $CaCO_3$ | 17.1 | 20.85 | 15.1 | 7.1 |
| sulfur | 10 | 10 | 10 | 10 |
| polybutadiene A | 9 | 9 | 9 | 9 |
| polybutadiene B (functionalized) | 2 | 2 | 2 | 2 |
| linseed oil | 24 | 24 | 24 | 24 |
| graphite | 14 | 14 | 14 | 14 |
| vulcanization accelerator A (mercapto class) | 1 | 1 | 1 | 1 |
| hollow glass spheres | 4 | 0 | 0 | 0 |
| polymer balloons | 0 | 0.25 | 0 | 0 |
| perlite hollow microspheres having a closed outer shell | 0 | 0 | 6 | 14 |

TABLE 1-continued

| Composition | 1 | 2 | 3 | 4 |
|---|---|---|---|---|
| pyrogenic silicic acid | 1.5 | 1.5 | 1.5 | 1.5 |
| blowing agent | 0.15 | 0.15 | 0.15 | 0.15 |
| vulcanization accelerator B (dithiocarbamate class) | 0.9 | 0.9 | 0.9 | 0.9 |
| additives | 0.1 | 0.1 | 0.1 | 0.1 |
|  | 100.00 | 100.00 | 100.00 | 100.00 |
| Density [g/cm³] | 1.31 | 1.29 | 1.31 | 1.12 |
| Shore A Hardness [SKT] | 82 | 81 | 83 | 84 |
| Stability against pressure | up to 360 bar | not stable | up to 360 bar | up to 360 bar |
| Viscosity at 40° C. [Pa * s] | 6.7 | 7.0 | 6.9 | 11.0 |
| Approximate cost [€/kg] | 1.42 | 1.29 | 1.32 | 1.39 |

Compositions 3 and 4 according to the invention comprising the expanded perlite particles having a closed outer shell are both easy to handle and can be pumped at pressures of up to 360 bar without the lightweight filler getting damaged. Owing to the closed outer shell thereof and pressure stability, these particles do not absorb any constituents of the composition or any water, and therefore the weight-reducing effect is maintained and the other mechanical properties are not adversely affected. Thus, these compositions also exhibit excellent adhesion and result in a particularly smooth surface of the foamed product. In addition, these compositions have a particularly high strength.

What is claimed is:

1. A composition comprising:
   a) at least one reactive binder;
   b) at least one curing agent and/or accelerator;
   c) at least one thermally activatable blowing agent, the at least one thermally activatable blowing agent releasing gas after being heated to a temperature ranging from 120° C. to 220° C. for 10 to 150 minutes and being selected from solid polycarboxylic acids, salts of said solid polycarboxylic acids, and mixtures thereof; and
   d) at least one lightweight filler, wherein the at least one lightweight filler includes at least one expanded particle of at least one glass-rich volcanic rock, the glass-rich volcanic rock forms a closed outer shell, wherein the expanded particles have a bulk density of 100 kg/m³ to 500 kg/m³; and
the composition is free of hollow glass spheres and free of polymer balloons, is foamable, has a density of 0.9 g/cm³ to 2 g/cm³, and is pumpable and stable at a temperature below 70° C. and at a pump pressure of up to 360 bar.

2. The composition according to claim 1, wherein the at least one reactive binder is selected from epoxides, rubbers, peroxidically crosslinkable polymers or triglyceride fractions comprising unsaturated fatty acids.

3. The composition according to claim 1, wherein the at least one reactive binder comprises 5-50 wt. % of at least one polyene.

4. The composition according to claim 3, wherein the at least one polyene is a liquid polybutadiene having a molecular weight Mw below 20,000.

5. The composition according to claim 1, wherein the at least one reactive binder comprises 5-50 wt. % of at least one triglyceride fraction of which the fatty acid distribution has a proportion of at least 5 wt. % of one or more 2-3 fatty acids and/or one or more Ω-6 fatty acids.

6. The composition according to claim 1, wherein the at least one curing agent and/or accelerator is present in an amount of from 0.25 to 15 wt. % of the composition.

7. The composition according to claim 1, wherein the at least one chemical blowing agent is present in an amount of from 0.1 to 15 wt. % of the composition.

8. The composition according to claim 1, wherein the at least one expanded particle of at least one glass-rich volcanic rock is present in an amount of from 1 to 35 wt. % of the composition.

9. The composition according to claim 8, wherein the at least one expanded particle of at least one glass-rich volcanic rock comprises at least one expanded perlite.

10. The composition according to claim 1 including a plurality of the expanded particles of at least one glass-rich volcanic rock, wherein the expanded particles of at least one glass-rich volcanic rock have a maximum particle size of less than 1,000 μm, and/or a weight-average particle size d50 of less than 500 μm.

11. The composition according to claim 1, wherein the at least one expanded particle of at least one glass-rich volcanic rock, acting as a lightweight filler, has a bulk density of from 200 kg/m³ to 500 kg/m³.

12. A method for stiffening and/or reinforcing components which have thin-walled structures, wherein a composition according to claim 1 is applied to a surface of the structure to be reinforced at a temperature below 70° C., at a pump pressure of greater than 3 bar, and said composition is cured at a later point in time at temperature(s) above 130° C.

13. The stiffening and/or reinforcing method according to claim 12, wherein the composition is applied in a temperature range of from 40° C. to 60° C. at an application pressure of from 6 bar to 180 bar.

14. A component stiffened and/or reinforced with the composition according to claim 1.

15. A component stiffened and/or reinforced with the composition produced according to the method of claim 12.

16. An article of manufacture comprising a thin-walled structure, having a hollow cavity, and a composition according to claim 1 cured in or on the thin-walled structure whereby the thin-walled structure is stiffened and/or reinforced.

17. A composition comprising:
   a) at least one reactive binder;
   b) at least one curing agent and/or accelerator;
   c) at least one thermally activatable blowing agent, the at least one thermally activatable blowing agent releasing gas after being heated to a temperature ranging from 120° C. to 220° C. for 10 to 150 minutes and being selected from solid polycarboxylic acids, salts of said solid polycarboxylic acids, and mixtures thereof; and d) at least one lightweight filler, wherein the at least one lightweight filler includes at least one expanded particle of at least one glass-rich volcanic rock comprising perlite, said at least one expanded particle having a closed outer shell, a maximum particle size of less than 1,000 micron, a bulk density of 200 to 500 kg/m³; and exhibiting pressure stability such that the composition can be pumped at pump pressure of up to 360 bar without damage to the lightweight filler; wherein the composition is foamable, has a density of 0.9 g/cm³ to 1.2 g/cm³, and is pumpable and stable at a temperature below 70° C. and at a pump pressure of up to 360 bar.

18. The composition according to claim 17, wherein the at least one reactive binder is selected from epoxides, rubbers, peroxidically crosslinkable polymers or triglyceride fractions comprising unsaturated fatty acids.

19. The composition according to claim 17, wherein the at least one reactive binder comprises 5-50 wt. % of at least one polyene.

20. A composition comprising:
  a) 5 to 50 wt. % of at least one reactive binder comprising:
    1) a triglyceride fraction or oil containing the triglyceride fraction,
    2) a liquid polybutadiene; and
    3) a functionalized polybutadiene;
  b) at least one curing agent and at least one organic curing accelerator;
  c) 0.1 to 15 wt. % of at least one thermally activatable blowing agent;
  d) 1 to 35 wt. % of at least one lightweight filler, wherein the at least one lightweight filler includes expanded perlite particles having a closed outer shell, a maximum particle size of less than 1,000 micron and a bulk density of 200 to 500 kg/m³; and
  e) a combination of three or more inorganic fillers different from d), the combination comprising:
    1) 21 to 30 wt. % calcium carbonate,
    2) 2 wt. % to 15 wt. % of at least one sheet-like inorganic filler selected from graphite;
    3) 0.1 to 4 wt. % of at least one rheology additive inorganic filler selected from silicon dioxide;
  wherein the composition is foamable, has a density of 0.9 g/cm³ to 1.2 g/cm³, and is pumpable and stable at a temperature below 70° C. and at a pump pressure of up to 360 bar without damage to d).

* * * * *